US006228419B1

(12) United States Patent
Yuan et al.

(10) Patent No.: US 6,228,419 B1
(45) Date of Patent: *May 8, 2001

(54) HIGH-AMYLOSE STARCH-EMULSIFIER COMPOSITION AND METHODS OF MAKING

(75) Inventors: Chienkuo Ronnie Yuan; Noel G. Rudie, both of Chelmsford, MA (US)

(73) Assignee: Opta Food Ingredients, Inc., Bedford, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,520

(22) Filed: Oct. 20, 1998

(51) Int. Cl.$^7$ .............................. A23L 1/0522; A23L 1/10; A23L 1/307
(52) U.S. Cl. ...................... 426/661; 426/804; 106/145.1; 106/145.4; 106/145.5; 106/206.1; 106/210.1; 106/215.3; 106/215.4
(58) Field of Search ...................................... 426/661, 804; 106/145.1, 145.4, 145.5, 206.1, 210.1, 215.3, 215.4

(56) References Cited

U.S. PATENT DOCUMENTS

| | | | |
|---|---|---|---|
| 4,260,642 | 4/1981 | Mitchell et al. | 426/579 |
| 4,491,483 | 1/1985 | Dudacek et al. | 127/33 |
| 4,499,116 | 2/1985 | Zwiercan et al. | 426/582 |
| 5,100,475 | 3/1992 | Würsch et al. | 127/67 |
| 5,185,176 | 2/1993 | Chiu | 426/651 |
| 5,281,432 | 1/1994 | Zallie et al. | 426/549 |
| 5,291,877 | 3/1994 | Conde-Petit et al. | 127/33 |
| 5,409,726 | 4/1995 | Stanley et al. | 426/573 |
| 5,755,890 | 5/1998 | Yuan | 127/71 |
| 6,017,388 | * 1/2000 | Yuan | 106/210.1 |

FOREIGN PATENT DOCUMENTS

| | | |
|---|---|---|
| 0 011 479 A1 | 5/1980 | (EP) . |
| 0 076 381 A2 | 4/1983 | (EP) . |
| 0 150 715 A2 | 8/1985 | (EP) . |
| 0 519 104 B1 | 12/1992 | (EP) . |
| 2 629 684 | 10/1989 | (FR) . |
| WO 94/09645 | 5/1994 | (WO) . |

OTHER PUBLICATIONS

Robyt, J.F., "Enzymes in the Hydrolysis and Synthesis of Starch" In *Starch: Chemistry and Technology*, R.L. Whistler, et al., eds. (NY: Academic Press, Inc.), pp. 87–89, 94 (1984).

Deffenbaugh, Lynn B. et al., "Use of the Rapid Visco–Analyzer to Measure Starch Pasting Properties," Starch/Stärke 42:89–95 (1990).

Galloway, G.I., et al., "Properties and Structure of Amylose–Glyceryl Monostearate Complexes Formed in Solution or on Extrusion of Wheat Flour," *Journal of Food Science*, 54(4)950–957 (1989).

Seneviratne, H.D., and Biliaderis, C.G., "Action of α–Amylases on Amylose–lipid Complex Superstructures," *Journal of Cereal Science*, 13:129–143 (1991).

Billiaderis, Costas G., "On the Multiple Melting Transitions of Starch/Monoglyceride Systems," *Food Chemistry*, 22:279–295 (1986).

Eliasson, A.C., and Krog, N., "Physical Properties of Amylose–Monoglyceride Complexes," *Journal of Cereal Science*, 3:239–248 (1985).

Karkalas, John, and Raphaelides, Stilianos, "Quantitative Aspects of Amylose–Lipid Interactions," *Carbohydrate Research*, 157:215–234 (1986).

Goto, Masaru, et al., "Starch Additives To Food For Frying," *Chemical Abstracts*, vol. 124, No. 15, Abstract No. 200687, (Apr. 9, 1996).

Shoichi, Kobayashi, et al., "Method for Dissolving Starch," Patent Abstracts of Japan.

Kowblansky, Marie, "Calorimetric Investigation of Inclusion Complexes of Amylose with Long–Chain Aliphatic Compounds Containing Different Function Groups," *Macromolecules*, 18:1776–1779 (1985).

\* cited by examiner

Primary Examiner—David Brunsman
(74) Attorney, Agent, or Firm—Hamilton, Brook, Smith & Reynolds, P.C.

(57) ABSTRACT

A method of producing high-amylose based starch-emulsifier compositions by heating a high-amylose starch in the presence of an emulsifier to form a complex with unique properties is described. High-amylose starch-emulsifier compositions (e.g., powders, gels, pastes) produced by this method and food products containing the high-amylose starch-emulsifier composition are also described.

24 Claims, No Drawings

HIGH-AMYLOSE STARCH-EMULSIFIER COMPOSITION AND METHODS OF MAKING

BACKGROUND OF THE INVENTION

Starch is composed primarily of two components: amylose, a mainly linear polymer of about 500–6000 α-D glucosyl residues, and amylopectin, a highly branched polymer of α-D glucosyl distributed in 15–60 residues per chain (Godet et al., *Carbohydrate Polymers* 27:47–52 (1995)). It is well known that amylose can form complexes with molecules such as iodine, alcohols and lipids, whereas amylopectin forms these complexes weakly or not at all (Morrison et al., *Cereal Chem* 70:385–91 (1993); Sarko & Zugenmaier, *Fiber Diffraction Methods*, A. D. French & K. C. Gardner, Eds., ACS Symposium Series 141:459–482 (1980)). The in situ biosynthesis of amylose-lipid complexes in starch with naturally occurring fatty acids and phospholipids has been demonstrated (Morrison et al. (1993)). Others have shown that complex formation occurs during heat/moisture treatments, especially during gelatinization of starches with naturally containing lipids (Kugimiya et al., *Stäke* 32:265–270 (1980); Kugimiya & Donovan, *J. Food Sci.* 46:765–777 (1981)) or when lipids are added to defatted starches (Biliaderis et al., *Food Chem.* 22:279–295 (1986)) or pure amylose which is free of natural lipids (Biliaderis et al, *Carbohydr. Polym.* 5:367–389 (1985)).

Both naturally-occurring and heat-formed complexes show specific properties such as a decrease in amylose solubility or an increase in gelatinization temperatures (Eliasson et al., *Stäke* 33:130 (1981), Morrison et al. (1993)). Polar lipids, e.g., fatty acids and their monoglyceride esters are of technological importance in starch systems, as they cause a reduction in stickiness, improved freeze-thaw stability (Mercier et al., *Cereal Chem.* 57:4–9 (1980) and retardation of retrogradation. One important example is the use of fatty acids and monoglycerides as anti-staling agents in bread and biscuits. Incorporation of such additives in the dough induces a slower crystallization (retrogradation) of the amylose fraction and retards the staling of bread (Krog, *Stäke* 22:206–210 (1971)).

SUMMARY OF THE INVENTION

The present invention pertains to high-amylose starch-emulsifier compositions and methods of making the high-amylose starch-emulsifier compositions comprising heating high-amylose starch (e.g., jet-cooking, heating in a batch cooker) in the presence of an emulsifier to produce a high-amylose starch-emulsifier dispersion which can be optionally treated to obtain a yield of approximately greater than 20% short chain high-amylose.

In one embodiment of the invention, a mixture of high-amylose starch and an emulsifier in an aqueous medium are heated (e.g., jet-cooked) under conditions sufficient to disrupt essentially all starch granules and solubilize amylose and amylopectin in the starch. The product contains a dispersion of gelatinized high-amylose starch and emulsifier which is believed to be in the form of a complex, as seen by X-ray diffraction and confirmed by differential scanning calorimetry (DSC). The dispersion of high-amylose starch and emulsifier can optionally be dried to a powder.

In another embodiment of the invention, a high-amylose starch and emulsifier are heated (e.g., jet-cooked) to produce a dispersion of gelatinized high-amylose starch and emulsifier in which the amylose and amylopectin are solubilized. Optionally, the high-amylose starch can then be hydrolyzed to release short chain amylose, preferably using enzymatic treatment. After hydrolysis of the starch-emulsifier solution, the solution can optionally be heated to a temperature sufficient to liquify the emulsifier, thereby increasing the percentage of high-amylose starch-emulsifier complex. Preferably, the solution is spray dried into a rehydratable powder, but it can be cooled to form a short-textured, non-elastic paste which can then be dried.

The high-amylose starch-emulsifier compositions can also be optionally co-processed with hydrocolloids, polymers, gums, modified or variant starches, and combinations thereof, which can be added at any point in the processes described herein. These optional ingredients serve to change (e.g., increase or decrease) the functional properties (e.g., water binding capacity, oil binding capacity or viscosity) of the composition depending upon product end use. For example, these optional ingredients can be added to increase the overall water binding capacity of the high-amylose starch-emulsifier composition or change the rheology of the high-amylose starch-emulsifier composition.

The starch-emulsifier composition produced by a process which uses high-amylose starch is characterized by a relatively large particle size (a weight average of from about $10\mu$ to about $50\mu$), consists mainly of insoluble high amylose-lipid complex particles, forms particle gels upon rehydration which can regain its gel structure after homogenization, and is easy to disperse. The complex has less soluble materials than low-amylose starch-emulsifier complexes (~25% vs. 50%) and a greater gelling tendency when compared to low-amylose starch-emulsifier complexes. See U.S. Pat. Nos. 5,755,890 and 6,017,388 for low-amylose starch-emulsifier complexes. The dried high-amylose starch-emulsifier composition, as mentioned, can be rehydrated, preferably in an aqueous medium suitable for use in food or beverage formulations (e.g., milk or water), under conditions of medium to high shear to produce an opaque paste upon refrigeration.

The high-amylose starch-emulsifier compositions produced by the methods described herein are useful in a variety of food and beverage applications. For example, the high-amylose starch-emulsifier compositions can be used as an opacifier in foods or as a texturizing agent to prepare dairy products with a rheology similar to sour cream, reduced fat, low fat or no fat natural cheese, yogurt, mayonnaise and similar products. For example, the high-amylose starch-emulsifier compositions of the present invention can be used to prepare lactose-free dairy products. The high-amylose starch-emulsifier compositions can also be used as a fat replacer in a variety of reduced fat, low fat and fat-free foods, such as sauces, margarine, cream cheese and other spreads, snack dips, mayonnaise, sour cream, yogurt, pudding type deserts, ice cream, frozen desserts, fudge and other confections and skim milk. The high-amylose starch-emulsifier compositions can be incorporated into fat-free, reduced fat, low fat and fat containing cheeses, such as natural, processed and imitation cheeses in a variety of forms (e.g., shredded, block, slices, grated).

DETAILED DESCRIPTION OF THE INVENTION

The present invention pertains to methods of manufacture and the high-amylose starch-emulsifier compositions produced thereby that are useful in a variety of food and beverage applications. According to the invention, a high-amylose starch in an aqueous medium is heated in the presence of an emulsifier to a temperature and pressure sufficient to disrupt essentially all the starch granules and solubilize the amylose and amylopectin contained therein, such as by jet cooking, to yield a high-amylose starch-emulsifier dispersion. This dispersion can optionally be dried to a powder directly, or allowed to cool slowly or quickly to form an elastic gel. The powder can be rehydrated with medium to high shear to produce a particle gel. See Example 1.

Alternatively, a dispersion of the high-amylose starch-emulsifier complex produced as described above can be treated to generate greater than about 20% by weight short chain amylose (e.g., enzymatically debranched, hydrolysis of the backbone by amylase or acid hydrolysis). The resultant dispersion of high-amylose starch, containing greater than about 20% by weight short chain amylose, and emulsifier is optionally heated to a temperature sufficient to inactivate the enzyme if used and to liquify the emulsifier. Liquification of the emulsifier facilitates the formation of additional starch-emulsifier complexes in the final composition.

As used herein, high-amylose starch is defined as any starch having an amylose content of from about 30% by weight or greater of the starch. Sources of high-amylose starches include, but are not limited to, corn, oats, peas, barley and commercially available AMYLOMAIZE VII® (approximately 70% amylose) and AMYLOMAIZE V® (approximately 50% amylose) which are available from Cerestar USA. The term "gelatinization" or variant thereof, is intended to embrace the generally recognized term but also is intended to encompass the process of rupturing essentially all starch granules present in the high-amylose starch, thereby releasing amylose and amylopectin. For the purpose of the present invention, the term "solubilize" refers to the absence of any detectable particulate matter, especially partially disrupted starch granules, when viewed under 200 to 400-fold magnification using a standard light microscope.

The dispersion can be dried to a powder and rehydrated with medium to high shear to produce a short, non-elastic textured paste of high opacity upon refrigeration.

The high-amylose starch used as a starting material in the process of the present invention can be a native starch or a pregelatinized starch. If a pregelatinized starch is utilized, it should preferably contain a low amount of resistant starch, such as less than about 10% resistant starch. If the starting high-amylose starch has more than about 10% resistant starch, the high-amylose starch can be used in the present invention if it is first heated to a temperature above the melting point of the resistant starch.

Without wishing to be bound by theory, it is believed that the processes described herein yield compositions comprising high-amylose starch and emulsifier in the form of a complex having an insoluble microparticle nature which is stabilized by the interaction between amylose and emulsifier. The composition also comprises uncomplexed emulsifier and uncomplexed high-amylose starch, and optionally short chain amylose if debranching and/or hydrolysis is performed. Thus, emulsifiers capable of forming a complex with high-amylose are particularly preferred for use in the invention. Generally, the emulsifiers will be monoglycerides, sorbitan esters, diacetyl tartaric acid esters of monoglycerides (DATEM), propylene glycol esters, enzyme modified lecithin (EML), polysorbates and sucrose esters of medium and long chain saturated fatty acids (e.g., having an acyl group containing more than about 10 carbon atoms), as well as saturated fatty acids (e.g., saturated fatty acids which contain from about 12 to about 18 carbons) and unsaturated fatty acids (unsaturated fatty acids which contain from about 12 to about 18 carbons, e.g., oleic and linoleic acids). For example, emulsifiers including, but not limited to, polyethylene glycol monolaurate or glyceryl monostearate, sodium or calcium stearoyl-2-lactylate, polyoxyethylene sorbitan monostearate, sucrose monostearate and sucrose monopalmitate are suitable for use in the high-amylose starch-emulsifier composition of the present invention, as well as other saturated fatty acids. EML can be produced by treating lecithin with phospholipase A2. EML produced through the action of phospholipase A2 is enriched in lysophosphatydylcholine, which is known to form complex with amylose. Commercial EML is available at Lucas Meyer Inc. (Decatur, Ill.) and Central Soya Co. (Fort Wayne, Ind.). See Example 4.

The high-amylose starch and the emulsifier are combined in an aqueous medium such as water to produce a dispersion. The dispersion generally contains from about 5% to about 25% (w/w) of starch, with from about 10% to about 20% (w/w) being preferred. For the purposes of the present invention, "aqueous medium" is defined as water or a solution which is substantially water such as buffer, acid, base, salt, antioxidant, reducing agent, and/or chelating agent solutions or a blend of water with a miscible organic solvent, in an amount sufficient to inhibit oxidation of lipids present in the starch starting materials. It is preferred that the aqueous medium, such as water, be pretreated to remove dissolved minerals. The starch may be dispersed in an aqueous medium at ambient temperature or after the aqueous medium has been heated. The emulsifier will be present in an amount which is approximately from about 0.1% to about 25% of the starch weight, and more preferably from about 1% to about 10% of the starch weight present in the composition.

The dispersion is then heated under conditions appropriate to disrupt essentially all the starch granules and solubilize the amylose and amylopectin present in the high-amylose starch. This can be carried out, for example, by co-jet cooking the starch-emulsifier dispersion. Alternatively, the high-amylose starch-emulsifier dispersion can be heated in a reactor or batch cooker, or by any other method in which the high-amylose starch is gelatinized in the presence of the emulsifier, such as by extrusion. The high-amylose starch can also be jet cooked into the emulsifier; that is, the high-amylose starch can be heated to or above its gelatinization temperature and immediately combined with the emulsifier. The emulsifier may need to be dispersed beforehand in a little water and the dispersion added to the starch slurry prior to cooking; added to the jet cooked starch; or the high-amylose starch is jet cooked into the dispersion of the emulsifier. The temperature and pH necessary to disperse the emulsifier in water are characteristic for each emulsifier and can be determined by those skilled in the art. It is essential that the emulsifier and high-amylose starch be combined prior to the heating or jet cooking step or immediately after solubilization of the high-amylose starch, as later addition of the emulsifier results in a larger particle size and a gritty product due to retrogradation of the starch.

In one embodiment, after the high-amylose starch-emulsifier dispersion is heated to solubilize the high-amylose present in the high-amylose starch, the high-amylose starch is treated to release short chain amylose. Appropriate treatment of the high-amylose starch will result in a high-amylose starch material containing greater than about 20% short chain amylose. Generally, release of the short chain amylose from the starch will be carried out by enzymatically debranching the high-amylose starch, e.g., the high-amylose starch can be debranched with (1–6)-specific glycosidic enzymes which are capable of cleaving 1,6-alpha-D-glucosidic linkages. For instance, the starch-emulsifier dispersion can he treated with pullulanase or isoamylase, at a temperature and pH and for a time sufficient to allow the enzyme to release the short chain amylose. Generally, appropriate temperatures will range from about 25° C. to about 100° C., with from about 55° C. to about 65° C. being preferred, for a time of from about 1 hour to about 30 hours, depending on the enzyme utilized and the enzyme concentration. Furthermore, the pH of the solution will be from about 3.0 to about 7.5. In a particularly preferred method, the high-amylose starch-emulsifier dispersion is treated with pullulanase at 60° C. at pH 5 for about 4 hours. The optimum conditions for the enzymatic reaction will vary, with changes in parameters such as high-amylose starch and enzyme concentrations, pH, temperature and other factors which can be readily determined by the skilled artisan.

Alternatively, the high-amylose starch can be randomly hydrolyzed to produce greater than 20% short chain amylose by use of an appropriate acid, such as a mineral acid or organic acid. Generally, acid hydrolysis will take place at a pH of less than about 4.0 and at a temperature greater than about 60° C., depending upon the acid used. The conditions for acid hydrolysis should be such that inappropriate side reactions are minimized. Short chain amylose can also be generated by treating the high-amylose starch with α-amylase, alone or in combination with pullulanase. Substantial debranching or hydrolysis of the high-amylose starch (e.g., debranching sufficient to generate a high-amylose starch material containing greater than about 20% short chain amylose) results in a short textured, non-elastic paste.

The high-amylose starch-emulsifier dispersions can be heated to a temperature and pH and for a time sufficient to liquify the emulsifier, that is, a temperature above the melting point of the emulsifier, to produce additional high-amylose starch-emulsifier complexes in the composition. In most cases, a temperature of approximately 60° C. to approximately 100° C. is sufficient to liquify the emulsifier within the dispersion. The high-amylose starch-emulsifier dispersion can be heated by a number of conventional methods, including a heat exchanger, jacketed reactor, direct steam injection or extruder.

The high-amylose starch-emulsifier compositions that have been heat treated have a relatively high viscosity at approximately 10% to 25% solids. The relatively high viscosity product can be cooled slowly or rapidly to form a paste for use in food applications, or the relatively high viscosity composition can be optionally dried to produce a powder by a number of art-recognized methods, including spray drying, belt drying, freeze drying, drum drying or flash drying; however, in a preferred embodiment, the dispersion is spray dried. The powder can be stored at room temperature, and can be re-hydrated with water or another aqueous medium, preferably an aqueous medium which is appropriate for use in food and beverage formulations, under conditions of medium to high shear to give a paste of high opacity and short, non-elastic texture.

The high-amylose starch and emulsifier can also be co-processed with hydrocolloids, gums, polymers, modified or variant starches and combinations thereof to change the rheology or increase the water binding capacity of the high-amylose starch-emulsifier compositions. For example, xanthan gum, alginate-carrageenan, carboxymethyl cellulose, methyl cellulose, guar gum, gum arabic, locust bean gum and combinations thereof can be added to the high-amylose starch-emulsifier compositions at any time during the preparation thereof, as long as the additional ingredient(s) does not prevent the formation of the amylose-emulsifier complex. That is, these additional optional ingredients can be jet-cooked along with the high-amylose starch and emulsifier, optionally added prior to or after the debranching step, added to the paste composition or dry blended with the powdered composition after drying. Preferably, the hydrocolloid, gum, modified starch or polymer is dry blended with the powdered composition.

The high-amylose starch-emulsifier compositions of this invention comprise high-amylose starch-emulsifier complexes, uncomplexed emulsifier, uncomplexed high-amylose starch and optionally hydrolyzed high-amylose starch. The percentage of complex present in the composition will vary, however, the composition should comprise a minimum of about 20% by weight starch-emulsifier complex. The complexes are insoluble microparticulates which have an average particle size of from about $10\mu$ to about $50\mu$, consists mainly of insoluble high-amylose-lipid complex particles, forms particle gels upon rehydration which can regain its gel structure after homogenization, and is easy to disperse. Cooling should be carried out with a minimum of shear for maximum gel strength in the resultant product; however, application of shear during the cooling step can be used to produce a low viscosity product. Any efficient method of cooling can be used, such as, but not limited to, jacketed kettles, tube-n-tube heat exchangers, conventional heat exchangers, belt chillers and shell-n-tube heat exchangers. If the preparation is spray dried, then an amylose-lipid complex and an amorphous uncomplexed starch product will result. A non-retrograded starch is trapped in a glassy state which is characterized by the absence of crystalline regions within the starch polymer, that is, the glass is amorphous and non-crystalline. Consequently, starch in the glassy state can be more readily hydrated in water.

The glassy state is created by removing water from the solution sufficiently fast at a sufficiently elevated temperature to immobilize the starch molecules before they have a chance to order into the retrograded state. This is accomplished, for example, by drum drying, belt drying, flash drying or spray drying. Spray drying is preferred and is carried out by maintaining the filtered starch solution at an elevated temperature sufficient to prevent crystallization of the starch, for example at about 85° C. to about 95° C. The filtered starch solution is then fed to a commercially available spray dryer (for example, Crepaco Compact Spray Dryer, APV Crepaco Inc., Tonawanda, N.Y.) at a suitable inlet temperature. The treated starch solution is then atomized through the nozzle of the spray dryer. A variety of nozzles can be used, for example a two fluid nozzle from Spraying Systems Co., Wheaton, Ill. (Set Up 22B). The atomized mist of the treated starch solution is dried by subjecting the atomized mist to elevated temperatures (referred to as outlet temperature) in the spray dryer chamber. The resulting product is a free flowing white powder with a lower bulk density and is more readily hydrated in water compared with the retrograded starch counterpart. The inlet and outlet temperatures used depend on the type of spray dryer, the scale of the process, the feed rate and how much moisture is desired in the final product. The skilled artisan will be able to determine the appropriate outlet temperature, based on the conditions used and the desired properties of the final product. In one example using a two fluid nozzle from Spraying Systems Co., Wheaton, Ill. (Set Up 22B), the outlet air temperature is about 104° C. and the inlet temperature is about 182° C.

The complex has less soluble materials than previous starch-emulsifier complexes (~25% vs. 50%) and a greater gelling tendency when compared to previous starch-emulsifier complexes. See U.S. Pat. No. 5,755,890 and U.S. Ser. No. 09/082,345. The gel is short textured and non-elastic. The high-amylose starch-emulsifier complex tends to be less soluble than low-amylose starch-emulsifier complexes. Therefore, the high-amylose starch-emulsifier complex lends itself well to the formation of cheese products, for example. The formation of cheese involves the coagulation of the casein proteins and removal of the whey proteins. By decreasing the solubility, as in this case, the ingredient is retained to a greater degree (approximately 70%) in the finished cheese products. The specific use level for cheese is from about 0.2% to about 0.8% by weight of milk. The primary benefits of the high-amylose starch-emulsifier in fat-free mozzarella cheese, for example, are improved texture, increased cheese yield, and reduced starch contamination in whey. See Example 6.

The high-amylose starch-emulsifier compositions of the present invention are suitable for use in a variety of foods and beverages. The amount of high-amylose starch-emulsifier composition incorporated into the food or beverage will depend upon the formulation of the food, but will generally be approximately 1–10% by weight. For example, the high-amylose starch-emulsifier compositions can be used as an opacifier in milk and similar foods to improve the visual appeal of the food. The high-amylose starch-emulsifier compositions can also be used as a texturizing agent in various dairy foods. The high-amylose starch-emulsifier compositions are useful for preparing dairy products with a rheology similar to traditional sour cream, yogurt and mayonnaise formulations. For example, the high-amylose starch-emulsifier compositions can be used in the preparation of lactose-free dairy products. The compositions are particularly useful for the preparation of reduced-fat and fat-free food products, particularly margarines, pudding type desserts, sauces, snack dips, mayonnaise, sour cream, yogurt, ice cream, frozen desserts, cream cheese and other spreads, fudge and other confections, and skim milk. The high-amylose starch-emulsifier compositions can be incorporated into fat-free, reduced fat, low fat and fat containing cheeses, such as natural, processed and imitation cheeses in a variety of forms (e.g., shredded, block, slices, grated). See Example 7.

The terms "fat free", "no fat", "low fat" and "reduced fat" as used herein are intended to embrace the definitions set forth by the Nutrition Labeling and Education Act (NLEA), Federal Register, Jan. 6, 1993.

Terms used herein have their art-recognized meaning unless otherwise defined. The teachings of references referred to herein are incorporated herein by reference. All percentages are by weight unless otherwise specified.

The following examples are offered for the purpose of illustrating the present invention and are not to be construed to limit the scope of the present invention:

EXAMPLES

Example 1
Process of Making High Amylose Starch-Emulsifier Complex

Fifteen gallons (55 liters) of high-amylose starch (Amaizo V, Cerestar USA; containing 50% amylose) slurries (10% starch) with different levels of distilled monoglyceride emulsifier (Myverol 18-06, Quest International; containing 90% glyceryl monostearate) were prepared in a Likwifier mixer. The slurries were then pumped through a jet cooker operating at 150° C. and 120 psi steam pressure. The jet cooked starch-monoglyceride dispersions were kept at 90° C. in a jacketed kettle while being spray dried into a fine powder. The spray drier air inlet and outlet temperatures were typically 182° C. and 104° C., respectively. Four samples were prepared as described above with different monoglyceride contents:

Sample A: no monoglyceride added

Sample B: 1% (of starch weight) monoglyceride added

Sample C: 2% (of starch weight) monoglyceride added

Sample C: 4% (of starch weight) monoglyceride added.

Example 2
Characterization of the High Amylose Starch-Emulsifier Composition The four samples prepared according to Example 1 were analyzed for thermal properties, particle size distribution, and gel viscosity by differential scanning calorimeter (DSC), particle size distribution, and Brookfield viscometer, respectively.

A. DSC Thermal Analysis

Ten milligrams of powdered sample was weighed in a Perkin Elmer high pressure capsule DSC pan. The sample was mixed with 50 µL deionized water and hermetically sealed in the DSC pan. The sample was then analyzed (DSC 7, Perkin-Elmer, Norwalk, Conn.) from 20° C. to 160° C. at 10° C./minute with a sealed empty pan as a reference. Samples B, C and D showed an endothermic peak at about 102° C., typical of the melting of amylose-lipid complexes (ALC). No ALC melting peak was found in the scan

TABLE 1

| Sample | Enthalpy (J/g) |
| --- | --- |
| A | No peak |
| B | 4.56 |
| C | 7.62 |
| D | 8.38 |

B. Particle Size Distribution

A 5% dispersion of the sample was prepared by mixing the powder in deionized water at 25° C. using a Virtis blender (Virtis, Gardiner, N.Y.) at 18,000 rpm for 3 minutes. The particle size distribution of the dispersed sample was determined by using a laser light particle size analyzer (LS230, Coulter Corp., Miami, Fla.). Table 2 shows the average particle sizes of the samples.

TABLE 2

| Sample | Particle Size ($\mu$; volume average) |
| --- | --- |
| A | 16.4 |
| B | 12.2 |
| C | 18.7 |
| D | 21.4 |

C. Viscosity

A 5% dispersion of the sample was prepared by mixing the powder in 25° C. deionized water using a Virtis blender (Virtis, Gardiner, N.Y.) at 18,000 rpm for 3 minutes. The dispersion was refrigerated at 4° C. for 24 hours. The viscosity of the refrigerated dispersion was measured using a Brookfiled Viscometer with a helipath spindle at 2 rpm. Table 3 shows the viscosity data of the samples. No data was obtained for the sample without emulsifier (sample A) because the gel was too rigid to be measured by this instrumental technique.

TABLE 3

| Sample | Viscosity (cP) |
| --- | --- |
| B | 46,200 |
| C | 21,900 |
| D | 4,800 |

Example 3
Effect of Amylose Content

A composition was prepared according to Example 1 using 4% monoglyceride and a high amylose corn starch containing 70% amylose (Amaizo VII, Cerestar USA, Hammond, Ind.). The sample was characterized according to the protocols described in Example 2 and compared to sample D of Example 1, which used a starch containing 50% amylose as the starting material. Table 4 shows the results of each analysis for the two samples. No viscosity value was reported for the sample made with 70% amylose starch because the viscosity was too low to be measured by using the protocol.

TABLE 4

| Properties | Amylose content of starch | |
|---|---|---|
| | 50% | 70% |
| enthalpy of melting | 8.38 | 10.16 |
| particle size (μ) | 21.4 | 33.9 |
| viscosity (cP) | 4,800 | NA |

Example 4
Effect of Different Emulsifiers

Four samples were prepared according to Example 1 using 70% amylose starch (see Example 3) and 6% of 4 different emulsifiers. The four emulsifiers were monoglycerides (Myverol 18-06, Quest International), enzyme modified lecithin (Lecimulthin 150, Lucas Meyer Inc., Decatur, Ill.), DATEM (Admul DATEM, Quest International), and sucrose fatty acid ester (S-1670, Mitsubishi-Kagaku Foods Corp., Tokyo, Japan). The samples were characterized according to the protocols described in Example 2 and the results are presented in Table 5. No viscosity value was reported for the samples that did not set into the gel.

TABLE 5

| | Emulsifier type | | | |
|---|---|---|---|---|
| Property | Monoglyderide | Enz. Mod. Lecithin | DATEM | sucrose ester |
| ΔH (J/g) | 12.31 | 4.89 | 5.23 | 10.2 |
| Particle size (μ) | 47.6 | 36.4 | 12.3 | 41.8 |
| Viscosity (cP) | NA | NA | 5,400 | NA |

Example 5
Fat-free Cheese Model

A cheese model was used to evaluate the functionality of the complex in increasing cheese yield of fat-free cheeses and decreasing starch partitioning into the whey. Four hundred and fifty grams of skim milk was heated to 45° C. and then acidified to pH 6.1 with 17% phosphoric acid. One and eight-tenths grams (0.4% of milk weight) of high-amylose starch-emulsifier complex prepared in Example 3 was dispersed in 200 g of the pre-acidified skim milk using a Virtis blender (Virtis, Gardiner, N.Y.) at 12,000 rpm for 2 minutes. The dispersion was combined with the remaining 250 g milk and then placed in a 38° C. water bath. To set the milk into a curd, 0.56 g of glucono-δ-lactone and 0.3 mL of chymosin (1/40 dilution; Maxerin, Gist-Brocades, Menomonee Falls, Wis.) was added to the milk preparation. The curd was cut into small pieces (approximately 1×1×3 cm) about 25 minutes after adding the chymosin. The curd was then combined with 0.45 g of glucono-δ-lactone and cooked in a 42° C. water bath for 30 minutes. Whey was drained from the curd at room temperature for 2 hours. The whey was collected quantitatively for starch analysis. The weight of the curd was then determined and used to calculate the yield. The same protocol was repeated for a 70% amylose starch control (produced using the procedure described in Example 1 without the addition of emulsifier) and a negative control (no starch ingredient was added). The curd yields and the amounts of starch in whey (expressed as percentage of total starch used) are shown in Table 6.

TABLE 6

| | Negative control | Starch control | Starch-emulsifier |
|---|---|---|---|
| Curd yield (%) | 14.1 | 15.9 | 17.3 |
| Amount of starch in whey (%) | NA | 51.5 | 30.0 |

Example 6
Fat-free Mozzarella Cheese

This example shows the effect of the high-amylose starch-emulsifier complex described in Example 3 on the yield and texture of fat-free mozzarella cheese. Cold (3° C.) raw skim milk was acidified to pH 6.30 using acetic acid. The test ingredient (0.4% by weight of milk) was then dispersed in the acidified milk using a Tri-blender. After pasteurizing at 74° C. for 16 seconds, the milk was then cooled to 39° C. in a cheese vat. The mozzarella cheese was made according to a common procedure including the following steps:

1. Adding starter culture and coagulant
2. Setting the milk at 39° C
3. Cutting curd using ⅜' wire knives
4. Cooking curd to 41° C.
5. Draining whey
6. Milling and rinsing curd
7. Salting
8. Heating curd in 82° C. water in a mozzarella cheese mixer and molder
9. Cooling cheese to 32° C. in a cold water bath
10. Packaging The cheese was evaluated against a negative control for overall texture preference (OTP) by a sensory panel one month after storage. Cheese yields and OTP scores are presented in Table 7.

TABLE 7

| | Negative control | Cheese with test ingredient |
|---|---|---|
| Cheese yield (%) | 8.05 | 10.16 |
| OTP (1 = dislike, 10 = like) | 3 | 6 |

Example 7
Fat-free Cheddar Cheese

The same ingredient used in Example 6 was also evaluated in fat-free cheddar cheese. The ingredient (0.6% by weight of milk) was dispersed in cold (3° C.) raw skim milk using a Tri-blender. The milk was then pasteurized to 74° C. for 16 seconds and cooled to 32° C. in a cheese vat. The fat-free cheddar cheese was made using a common procedure outlined as follows:

1. Adding starter culture and coagulant
2. Setting the milk at 32° C.
3. Cutting the curd using ⅜' wire knives
4. Cooking the curd to 38° C.
5. Draining the whey
6. Washing the curd 7. Salting
8. Hooping and pressing
9. Packaging The cheese was evaluated against a negative control for overall texture preference (OTP) by a sensory panel three months after storage. Cheese yields and OTP scores are presented in Table 8.

TABLE 8

|  | Negative control | Cheese with test ingredient |
|---|---|---|
| Cheese yield (%) | 5.63 | 6.21 |
| OTP (1 = dislike, 10 = like) | 1.5 | 5.0 |

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A cheese comprising a high-amylose starch-emulsifier composition having a short, non-elastic texture and comprising high-amylose starch-emulsifier complexes, uncomplexed emulsifier and uncomplexed high-amylose starch, said complex having a weight average particle size from about $10\mu$ to about $50\mu$.

2. The cheese of claim 1, wherein the emulsifier is selected from the group consisting of monoglycerides, enzyme modified lecithin, sorbitan esters, diacetyl tartaric acid esters of monoglycerides, propylene glycol esters, polysorbates and sucrose esters of medium and long chain saturated fatty acids and combinations thereof.

3. The cheese of claim 1, wherein the emulsifier is selected from the group consisting of glyceryl monostearate, polyethylene glycol monolaurate, calcium stearoyl lactate, sodium stearoyl lactate, polyoxyethylene sorbitan monostearate, sucrose monopalmitate, sucrose monostearate and combinations thereof.

4. The cheese of claim 1 which is a reduced fat, low fat or fat-free cheese.

5. The cheese of claim 1 wherein the starch has an amylose content of from about 30% or greater.

6. The cheese of claim 1 wherein the high-amylose starch is selected from the group consisting of cornstarch, potato, tapioca, wheat, smooth pea, rice, sago, barley and oat.

7. The cheese of claim 1, wherein the amount of emulsifier is from about 0.1% to about 25% by weight.

8. The cheese of claim 1, wherein the amount of emulsifier is from about 1% to about 10% by weight.

9. The cheese of claim 1, further comprising a modified or variant starch, hydrocolloid, gum, polymer or combination thereof.

10. The cheese of claim 9, wherein the hydrocolloid, gum, polymer or modified starch is selected from the group consisting of xanthan gum, alginate-carrageenan, carboxymethyl cellulose, methylcellulose, guar gum, gum arabic and locust bean gum.

11. The cheese of claim 1 wherein the high-amylose starch-emulsifier is present in an amount of from about 0.2% to about 0.8% by weight milk.

12. The cheese of claim 1 wherein the cheese is a natural, processed or imitation cheese.

13. A cheese comprising a high-amylose starch-emulsifier composition having a short, non-elastic texture and comprising high-amylose starch-emulsifier complexes, greater than about 20% by weight short chain amylose, uncomplexed emulsifier and uncomplexed high-amylose starch, said complex having a weight average particle size from about $10\mu$ to about $50\mu$.

14. The cheese comprising a high-amylose starch-emulsifier composition of claim 13, wherein the emulsifier is selected from the group consisting of monoglycerides, enzyme modified lecithin, sorbitan esters, diacetyl tartaric acid esters of monoglycerides, propylene glycol esters, polysorbates and sucrose esters of medium and long chain saturated fatty acids and combinations thereof.

15. The cheese comprising a high-amylose starch-emulsifier composition of claim 13, wherein the emulsifier is selected from the group consisting of glyceryl monostearate, polyethylene glycol monolaurate, calcium stearoyl lactate, sodium stearoyl lactate polyoxyethylene sorbitan monostearate, sucrose monopalmitate, sucrose monostearate and combinations thereof.

16. The cheese of claim 13 which is a reduced fat, low fat or fat-free cheese.

17. The cheese of claim 13 wherein the starch has an amylose content of from about 30% or greater.

18. The cheese of claim 13 wherein the high-amylose starch is selected from the group consisting of cornstarch, potato, tapioca, wheat, smooth pea, rice, sago, barley and oat.

19. The cheese of claim 13, wherein the amount of emulsifier is from about 0.1% to about 25% by weight.

20. The cheese of claim 13, wherein the amount of emulsifier is from about 1% to about 10% by weight.

21. The cheese of claim 13, further comprising a modified or variant starch, hydrocolloid, gum, polymer or combination thereof.

22. The cheese of claim 21, wherein the hydrocolloid, gum, polymer or modified starch is selected from the group consisting of xanthan gum, alginate-carrageenan, carboxymethyl cellulose, methylcellulose, guar gum, gum arabic and locust bean gum.

23. The cheese of claim 13 wherein the high-amylose starch-emulsifier is present in an amount of from about 0.2% to about 0.8% by weight milk.

24. The cheese of claim 13 wherein the cheese is a natural, processed or imitation cheese.

\* \* \* \* \*